(12) United States Patent
Dill et al.

(10) Patent No.: US 7,988,229 B2
(45) Date of Patent: Aug. 2, 2011

(54) VEHICLE SEAT ARRANGEMENT, ESPECIALLY FOR A MOTOR VEHICLE

(75) Inventors: Thomas Dill, Heilingenmoschel (DE); Ingo Teufel, Rockenhausen (DE); Ulf Schaeffling, Gaugrehweiler (DE); Kai Schumann, Rieschweiler-Mühlbach (DE); Heinrich Hammann, Teschenmoschel (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 309 days.

(21) Appl. No.: 12/301,481

(22) PCT Filed: Sep. 22, 2007

(86) PCT No.: PCT/EP2007/008264
§ 371 (c)(1),
(2), (4) Date: Nov. 19, 2008

(87) PCT Pub. No.: WO2008/043430
PCT Pub. Date: Apr. 17, 2008

(65) Prior Publication Data
US 2009/0230740 A1    Sep. 17, 2009

(30) Foreign Application Priority Data
Oct. 12, 2006   (DE) .................. 10 2006 050 222

(51) Int. Cl.
*A47C 15/00*    (2006.01)

(52) U.S. Cl. ......... 297/248; 297/232; 297/233; 297/257
(58) Field of Classification Search ................. 297/232, 297/233, 248, 257, 378.13; 296/64, 65.01, 296/65.11, 65.13; 292/35, 36, 137, 139, 292/262
See application file for complete search history.

(56) References Cited

U.S. PATENT DOCUMENTS

| 808,679 | A | * | 1/1906 | Pickles | .......... 297/236 |
| 2,543,167 | A | * | 2/1951 | Hening et al. | .......... 297/319 |
| 5,947,541 | A | * | 9/1999 | Behrens et al. | .......... 296/64 |
| 7,077,474 | B2 | * | 7/2006 | Satani | .......... 297/236 |
| 2005/0218684 | A1 | * | 10/2005 | Sumida et al. | .......... 296/64 |

FOREIGN PATENT DOCUMENTS

| DE | 102 57 162 A1 | 6/2004 |
| DE | 103 04 574 | 2/2005 |
| EP | 615879 | * 9/1994 |
| EP | 1 400 394 B1 | 3/2004 |
| FR | 2 775 637 | 9/1999 |

* cited by examiner

*Primary Examiner* — David Dunn
*Assistant Examiner* — Philip Gabler
(74) *Attorney, Agent, or Firm* — McGlew and Tuttle, P.C.

(57) ABSTRACT

A vehicle seat arrangement (1) is provided including a seat structure divided, in a transversal direction, into an outer first seat (11), a middle second seat (12), and an outer third seat (13), which can all be moved in a longitudinal direction in relation to the vehicle structure and can be locked therewith. The arrangement is provided with a coupling device (20) which couples the second seat (12) to one of the two outer seats (11, 13), forming a pair, when the other of the two outer seats (11, 13) is moved in relation to the pair in the longitudinal direction.

16 Claims, 3 Drawing Sheets

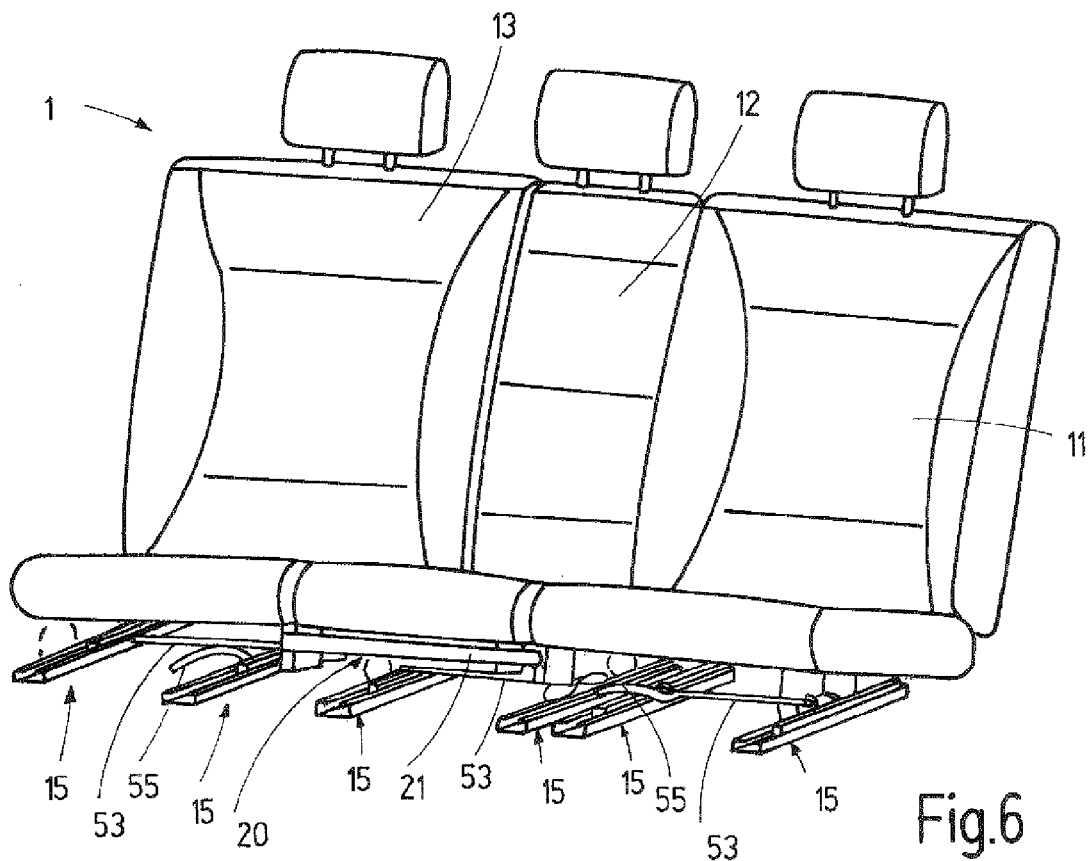
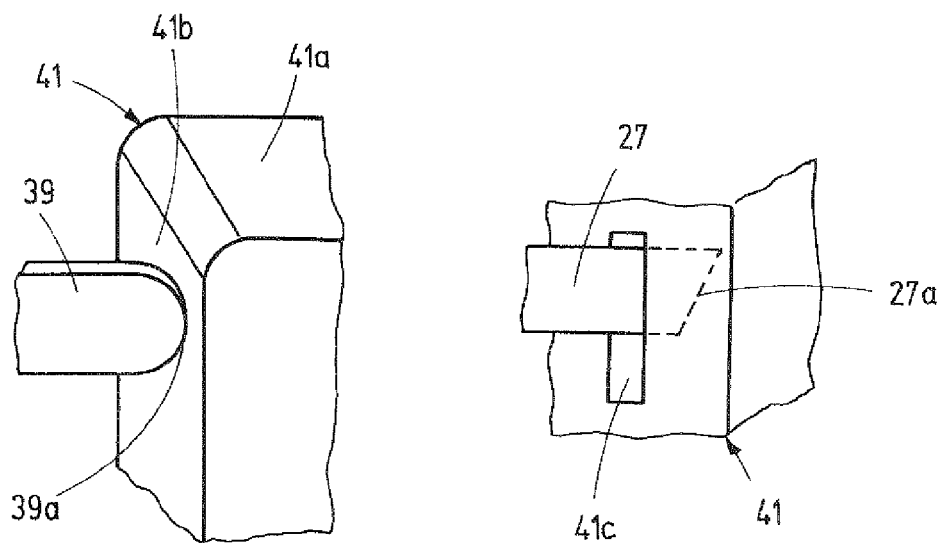
Fig.4  Fig.5  Fig.6

VEHICLE SEAT ARRANGEMENT, ESPECIALLY FOR A MOTOR VEHICLE

CROSS REFERENCE TO RELATED APPLICATIONS

This application is a United States National Phase application of International Application PCT/EP2007/008264 and claims the benefit of priority under 35 U.S.C. §119 of German Patent Application DE 10 2006 050 222.1 filed Oct. 12, 2006, the entire contents of which are incorporated herein by reference.

FIELD OF THE INVENTION

The invention relates to a vehicle seat arrangement, in particular for a motor vehicle, which seat arrangement is split in a transverse direction into an outer first seat, a central second seat and an outer third seat which may be displaced respectively in a longitudinal direction relative to the vehicle structure and may be locked thereto.

BACKGROUND OF THE INVENTION

Vehicle seat arrangements of this type are known in which the individual seats are displaceable independently of one another in the longitudinal direction. Insofar as the central seat is configured to be narrower, such seat is able to adopt a longitudinal seat position which is disadvantageous for comfort and safety.

SUMMARY OF THE INVENTION

The object of the invention is to improve a vehicle seat arrangement of the aforementioned type.

This object is achieved according to the invention by a vehicle seat arrangement for a motor vehicle Having a vehicle structure with the vehicle seat arrangement comprising a seat structure split in a transverse direction into an outer first seat, a central second seat and an outer third seat, which may be displaced respectively in a longitudinal direction relative to the vehicle structure and may be locked to the vehicle structure. A coupling device is provided for coupling the second seat to one of the two outer seats to form a seat pair, when the other of the two outer seats is displaced relative to the aforementioned seat pair in the longitudinal direction.

As a coupling device is provided which, by forming a pair, couples the central second seat to one of the two outer seats, when the other of the two outer seats is displaced relative to the aforementioned pair in the longitudinal direction, it is avoided that the second seat is arranged in the longitudinal direction offset to the two outer seats.

Preferably, during the displacement, an individual seat acquires the central seat by means of the coupling device, when passing the undisplaced pair, whilst during the displacement, a coupled pair is preferably uncoupled by means of the coupling device when passing the individual seat and the central seat is transferred to the undisplaced individual seat, so that the central seat is never on its own.

For the coupling, on the one hand a stop is preferably provided on the central seat which may come to bear against the two outer seats. Instead of an individual stop on the central seat, one respective stop may be provided on the outer seats acting in the same manner on the opposing end in the longitudinal direction. On the other hand, a lock is preferably provided between the two seats of a pair, for example by means of a locking bar mounted on the central seat, which may be extended in the transverse direction, which may be introduced into a lock of the outer seat. The lock may at the same time also form the counter stop for the aforementioned stop. The locking bar is preferably articulated on a rotatable lever which, preferably by pretensioning, assists the extension of the locking bar, i.e. the locking.

In order to uncouple the pair again by means of the other outer seat, preferably a release bar is provided which is arranged on the side of the individually displaced seat, i.e. opposite the locking bar. Preferably, the release bar is articulated on the same lever as the locking bar—opposite the rotational axis—so that by introducing the release bar the locking bar is also introduced.

In order to be able to operate both outer seats equally, the coupling device is preferably configured as a mirror image relative to the plurality of its functionally relevant components, the mirror images being able to be arranged in different planes for spatial reasons and for unrestricted operation.

The seats are generally displaceable by means of seat rail pairs in the longitudinal direction, the seat rail pairs being able to be unlocked by means of actuating levers. The coupling device preferably also comprises components which couple the actuating levers to one another, so that when forming the pair the seat rail pairs of the relevant seats are transferred into the same locked state. Such components may be an extension of the actuating levers or actuating elements specifically attached thereto, which extend over the seat rail pair of the respectively adjacent seat.

The invention may be used for all vehicles with a vehicle seat arrangement split in the transverse direction, for example in a second or third row of seats.

The invention is described in more detail hereinafter with reference to an embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a detailed view of a release bar and a lock;

FIG. 5 is a detailed view of a locking bar and a lock,

FIG. 6 is a perspective partially schematic view of the embodiment according to the invention.

DESCRIPTION OF THE PREFERRED EMBODIMENTS

Figure 1:
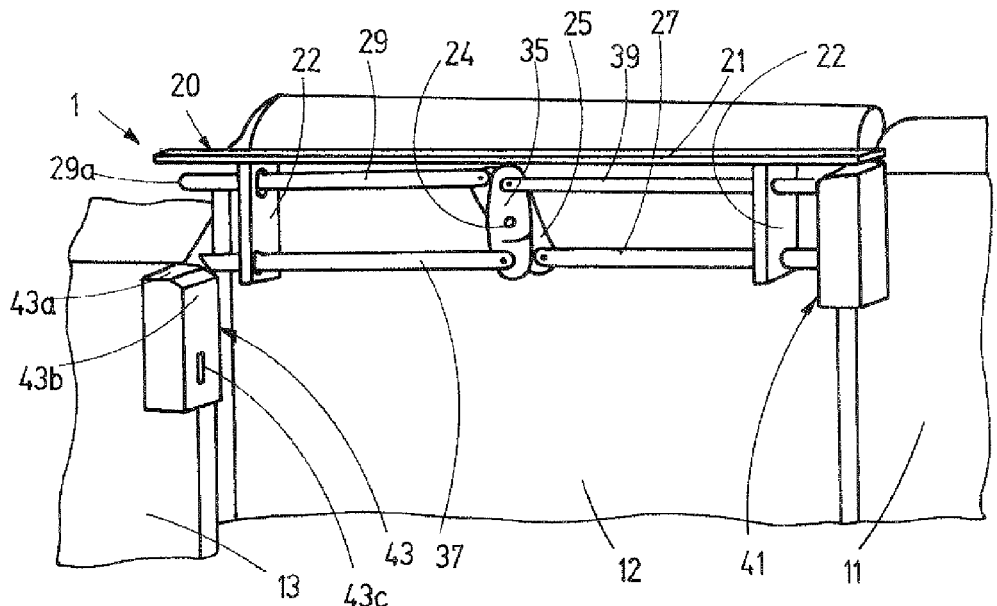
FIG. 1 is a partial view of the embodiment according to the invention, showing the coupling device coupling the first seat to the second seat.
Figure 2:
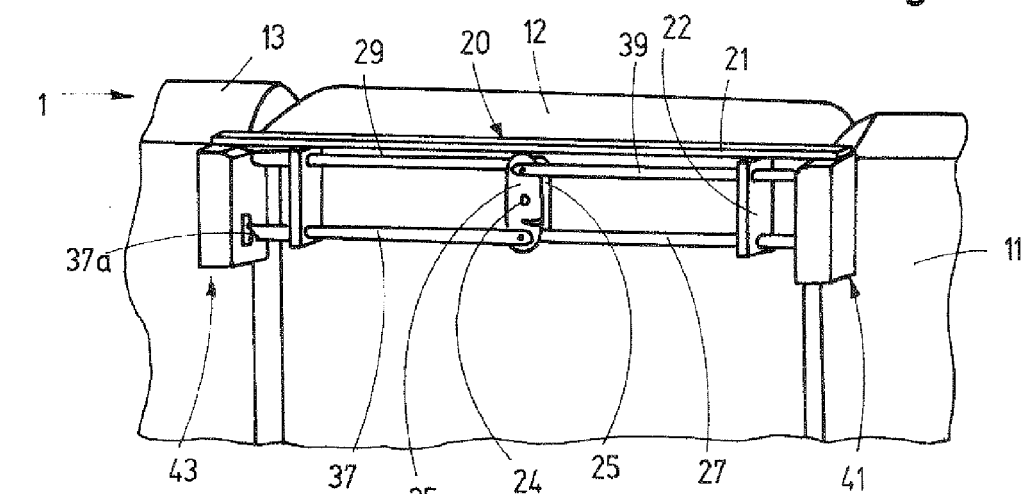
FIG. 2 is a partial view corresponding to FIG. 1, showing all three seats adopting the same longitudinal seat position.
Figure 3:
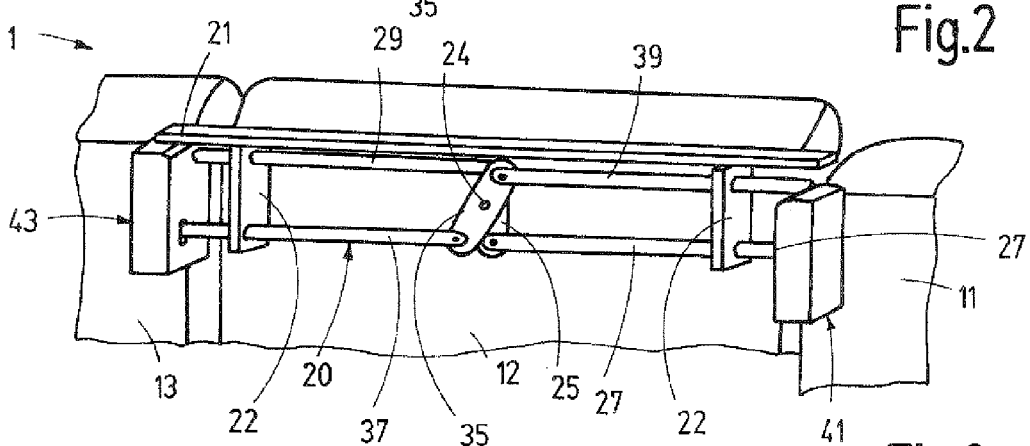
FIG. 3 is a partial view corresponding to FIG. 1 and FIG. 2, showing the coupling device coupling the second seat to the third seat.
Figure 7:
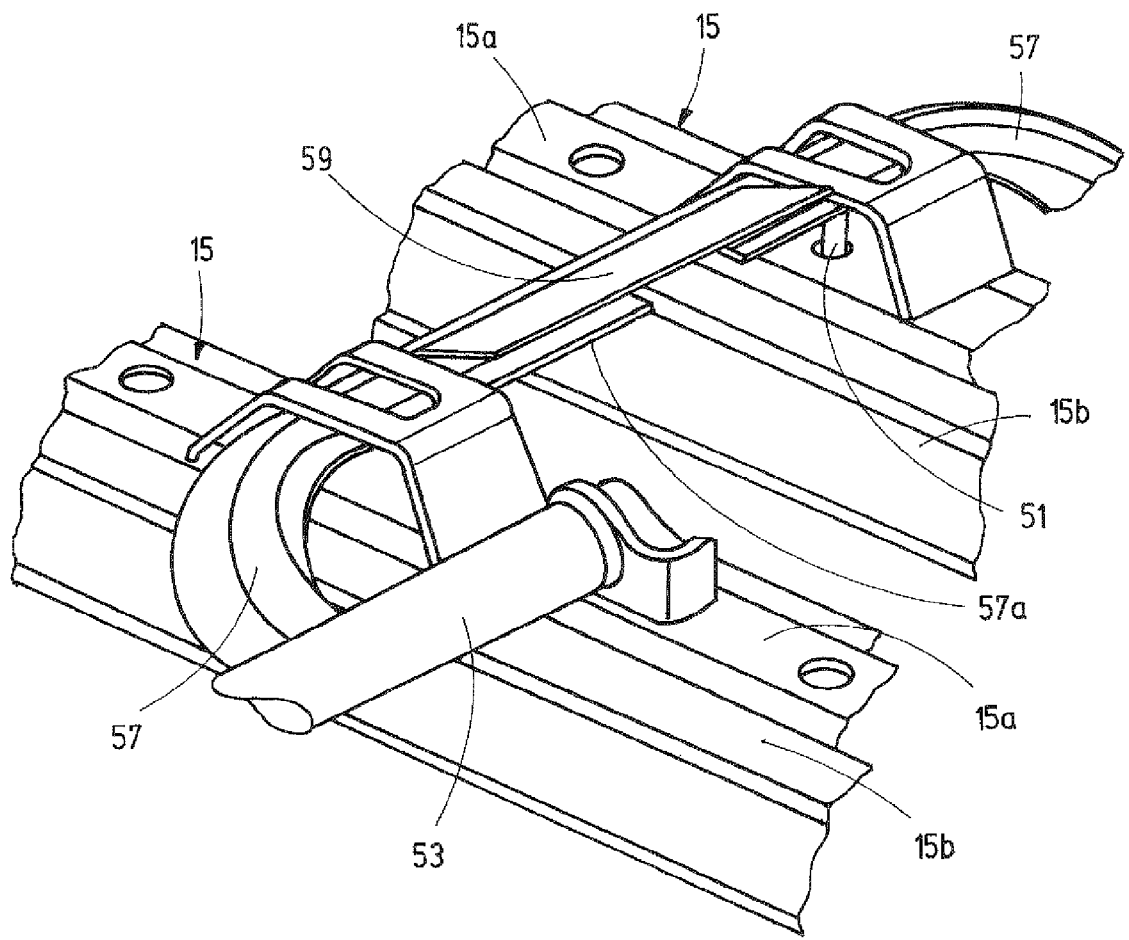
FIG. 7 is a perspective partial view showing the region of the rail locks of two seats.

Referring to the drawings in particular, a vehicle seat arrangement 1 is provided for a rear row of seats of a motor vehicle, for example for the second or third row of seats. The arrangement of the vehicle seat arrangement 1 in the motor vehicle and the usual direction of travel thereof define the following directional information used. In this case, the longitudinal direction is parallel to the direction of travel, whilst the transverse direction is the direction extending in a horizontal plane at right angles to the longitudinal direction.

The vehicle seat arrangement 1 in the present case is divided into the ratio of 40:20:40, whereby a first seat 11, a second seat 12 and a third seat 13 are defined. All three seats 11, 12 and 13 are connected to the vehicle structure by means of two respective seat rail pairs 15, which are attached to the respective seat 11, 12 or 13 on both sides in the transverse direction and displaceable and lockable relative thereto in the longitudinal direction. The first seat 11 is arranged to the left, the second seat 12 in the middle and the third seat 13 to the right. As regards the basic configuration, the three seats 11, 12 and 13 would be able to be displaced independently of one another in the longitudinal direction, i.e. they may adopt different longitudinal seat positions from one another.

A coupling device 20 ensures that the central, narrow second seat 12 is not displaced and able to be occupied relative to the two outer, wider seats 11 and 13 in the longitudinal direction. Instead, the central second seat 12 is coupled to one of the two outer seats 11 or 13 by forming a pair, and only the other of the two outer seats 11 or 13 may be displaced individually relative to the pair in the longitudinal direction. In this case, two embodiments are possible, namely that the individual seat 11 or 13 may be displaced either to the rear or to the front relative to the pair. The coupling device 20 substantially provided on the lower face of the second seat 12 is arranged in the first embodiment on the front end of the central seat 12 and in the second embodiment rotated by 180° in the horizontal plane at the rear end of the central seat 12. Since in this case left-right and front-rear are simply transposed, for the sake of simplicity only the first embodiment is described hereinafter.

The coupling device 20 has a stop 21 as a frontmost component, which projects over the central second seat 12 in the transverse direction on both sides. In the transverse direction within the second seat 12 two guides 22 project parallel to one another from the stop 21 in the longitudinal direction to the rear and are preferably fixedly connected thereto. The two guides 22 are fastened on the underside of the second seat 12 to the structure thereof. A bearing pin 24 similarly fixed to the structure projects downwardly from the second seat 12. The bearing pin 24 is arranged in the transverse direction in the center of the second seat 12 (and of the stop 21) and in the longitudinal direction in the center of the guides 22.

On the bearing pin 24 in an upper plane spanned by the longitudinal direction and the transverse direction a two-armed first lever 25 is centrally mounted in a rotatable manner. The first lever 25—defined by stops—is aligned in the longitudinal direction or at an acute angle obliquely thereto. On the rear end of the first lever 25, a first locking bar 27 is articulated, whilst at the front end of the first lever 25, i.e. opposite the first locking bar 27, a first release bar 29 is articulated (or a further release means is provided). The first locking bar 27 is approximately aligned in the transverse direction and faces toward the first seat 11, whilst the first release bar 29 is aligned approximately parallel thereto and faces toward the third seat 13. Both bars 27 and 29 project respectively through one aperture, respectively in one of the guides 22. The first locking bar 27 is at its free end provided with a first run-on slope 27a facing obliquely to the rear. The first release bar 29 is provided at its free end with a first control contour 29a, for example a radius.

In a lower plane spanned by the longitudinal direction and the transverse direction and as a mirror image to the aforementioned components of the coupling device 20 relative to the transverse direction, a two-armed second lever 35 is centrally mounted in a rotatable manner on the bearing pin 24. The second lever 35—defined by stops—is also aligned in the longitudinal direction or at an acute angle obliquely thereto. At the rear end of the second lever 35 a second locking bar 37 is articulated, whilst at the front end of the second lever 35, i.e. opposite the first locking bar 27, a second release bar 39 is articulated (or a further release means is provided). The second locking bar 37 is aligned approximately parallel to the aforementioned bars and faces toward the third seat 13, whilst the second release bar 39 is aligned approximately parallel thereto and faces toward the first seat 11. The second locking bar 37 is at its free end provided with a second run-on slope 37a facing obliquely to the rear. The second release bar 39 is at its free end provided with a second control contour 39a, for example a radius. One or more springs, only indicated in the drawings, for example torsion-helical springs or spiral springs, pretension the two levers 25 and 35 against one another or against the second seat 12 in the direction of extension of the bars 27, 29, 37 or 39.

The coupling device 20 has a first lock 41 on the first seat 11 at the front end thereof on the underside, on the side facing the second seat 12. The first lock 41 is provided on the front face of its housing which faces to the front with a first stop surface 41a for cooperating with the stop 21. The transition region of the housing from the first stop surface 41a to the side of the housing facing the second seat 12, and the front part of the last-mentioned side forms a first control surface 41b for cooperating with the second release bar 39, more specifically with the second control contour 39a thereof and with the first locking bar 27, more specifically the first run-on slope 27a thereof. In the side of the housing of the first lock 41 facing the second seat 12, a first locking opening 41c is provided for cooperating with the first locking bar 27 as a counter element.

As a mirror image to the first lock 41, the coupling device 20 on the third seat 13 has a second lock 43 on the front end thereof on the underside, on the side facing the second seat 12. The second lock 43 is provided on the front face of its housing which faces to the front with a second stop surface 43a for cooperating with the stop 21. The transition region of the housing from the second stop surface 43a to the side of the housing facing the second seat 12 and the front part of the last-mentioned side forms a second control surface 43b for cooperating with the first release bar 29, more specifically with the first control contour 29a thereof and with the second locking bar 37, more specifically the second run-on slope 37a thereof. In the side of the housing of the second lock 43 facing the second seat 12, a second locking opening 43c is provided for cooperating with the second locking bar 37 as a counter element. Insofar as the bars 27, 29, 37 and 39 are not held back by the locks 41 and 43, the pretensioning of the levers 25 and 35 ensures that the levers 25 and 35 are rotated out of the longitudinal direction and the bars 27, 29, 37 and 39 extend beyond the second seat 12 in the transverse direction.

For explaining the mode of operation of the coupling device 20, initially the first seat 11 is coupled to the second seat 12, this pair being intended to be arranged in front of the third seat 13 in the longitudinal direction. The stop 21 bears against the first stop surface 41a of the first lock 41. The first lever 25 is rotated obliquely to the longitudinal direction due to its pretensioning. The first locking bar 27 is extended and reaches through the first locking opening 41c of the first lock 41. The first seat 11 and the second seat 12 are thereby locked to one another. The second release bar 39 bears with its second control contour 39a against the first control surface 41b of the first lock 41, whereby the second release bar 39 is introduced. As a result, the second lever 35 is rotated counter to its pretensioning in the longitudinal direction and the second locking bar 37 is also introduced.

If the third seat 13 is now displaced to the front in the longitudinal direction, the second lock 43 initially passes the introduced second locking bar 37. If the second locking bar 37 is not fully introduced, the second lock 43 forces back the second locking bar 37 by means of its control surface 43b by bearing against the run-on slope 37a thereof and thereby introduces the second locking bar. Now the second lock 43 with the second control surface 43b bears against the first control contour 29a of the extended first release bar 29. With the further displacement of the third seat 13 to the front, the second lock 43 presses counter to the pretensioning of the first lever 25 on the first release bar 29, so that the first release bar 29 is introduced. As a result of the forced rotation of the first lever 25 in the longitudinal direction, the first locking bar 27 is also introduced. When the third seat 13 comes to bear against the stop 21 with the second stop surface 43b of its second lock 43, the third seat 13 carries along the second seat 12 to the front. When the second release bar 39 has passed the first control surface 41b of the first lock 41, the second release bar 39 may be extended due to the pretensioning of the second lever 35. As a result, the second locking bar 37 which reaches through the second locking opening 43c of the second lock 43, is also extended. The second seat 12 and the third seat 13 are, as a result, locked to one another.

Considered overall, the pushed-forward third seat 13 has thus unlocked (i.e. uncoupled) the previously locked pair made up of the first seat 11 and the second seat 12, acquired the second seat 12 and by forming a further pair is locked thereto. If the movements are reversed in their direction and sequence relative to the above embodiments, the pair made up of the second seat 12 and third seat 13 is unlocked when reaching the first seat 11, and the third seat 13 transfers the second seat 12 to the first seat 11, which is locked to the second seat 12.

In order to increase the operating comfort of the vehicle seat arrangement 1, the seat rail pairs 15 of the two outer seats 11 and 13 are able to be unlocked independently of one another by the user, whilst the seat rail pairs 15 of the central second seat 12 when transferred from an outer seat 11 or 13 to the other outer seat 13 or 11 are unlocked.

The rail locking, i.e. the locking of the seat rail pairs 15, is known per se and is explained with reference to the first seat 11. Each seat rail pair 15 is able to be locked by a spring-loaded latching plate, which simultaneously grips with teeth through openings or tooth gaps or the like of both seat rails of a seat rail pair 15. A guide pin 51 of the latching plate projects over the seat rail, on which the latching plate is mounted, in the present case the upper rail 15a connected to the structure of the first seat 11. A tube 53 extending in the transverse direction and which may be pivoted by a manually actuatable manual lever 55, pivots an actuating lever 57 on each seat rail pair 15, which presses onto the guide pin 51 and as a result lifts out the latching plate from the tooth gaps of the seat rail, which is displaceable relative to the latching plate, in the present case the lower rail 15b connected to the vehicle structure.

According to the invention, the manual lever 55 is dispensed with in the second seat 12. As a result, an actuating element 59 projecting in the transverse direction is attached to the actuating lever 57 in the adjacent seat rail pair 15 of the first seat 11, which may cooperate with an extension 57a of the actuating lever 57 of the most adjacent seat rail pair 15 of the second seat 12. When the first seat 11 is displaced toward the second seat 12, the actuating element 59 of the first seat 11, when pushed back, presses onto the extension 57a of the actuating lever 57 of the second seat 12 and thereby unlocks the second seat 12. If the manual lever 55 of the first seat 11 is released, the first seat 11 and the second seat 12 are locked.

The third seat 13 is configured corresponding to the first seat 11 and also has an actuating element 59 on the actuating lever 57 on the seat rail pair 15 adjacent to the second seat 12, which may unlock the second seat 12 by means of an extension 57a on the actuating lever 57 thereof.

In a further embodiment, not shown in the drawings, the coupling device 20 on the central seat 12 has one respective lock on both sides, as is disclosed for example in DE 103 04 574 B4, the disclosure thereof being expressly referred to. Instead of such a lock, a so-called rotary latch lock may also be used. The respective counter element for the lock is respectively provided on the adjacent outer seat 11 or 13. The locks and their counter elements thus undertake the function of the locking bars 27 and 37 and the locks 41 and 43. The mouth of the pawl of the lock also respectively takes over the task of the stop 21. A release means, for example a release bar, is articulated to the unlocking bolt of the lock or a further component of the unlocking, or coupled in another manner and guided in the transverse direction toward the opposing side of the second seat 12, where it may be extended over the second seat 12 according to the locked state of the lock.

While specific embodiments of the invention have been shown and described in detail to illustrate the application of the principles of the invention, it will be understood that the invention may be embodied otherwise without departing from such principles.

The invention claimed is:

1. A vehicle seat arrangement for a motor vehicle having a vehicle structure, the vehicle seat arrangement comprising:
    a seat structure split in a transverse direction into an outer first seat, a central second seat and an outer third seat, which may be displaced respectively in a longitudinal direction relative to the vehicle structure and may be locked thereto; and
    a coupling device for coupling the second seat to one of the two outer seats to form a seat pair, when the other of the two outer seats is displaced relative to the aforementioned seat pair in the longitudinal direction, said coupling device having at least one release means mounted on the second seat, said release means comprising a release bar cooperating with one of the outer first seat and the outer third seat when displaced relative to said pair for movement in the transverse direction relative to the second seat to uncouple said pair, wherein a locking bar is articulated on a lever rotatably mounted on the second seat, said release bar being articulated on the lever counter to the locking bar, and being guided by a guide on the second seat.

2. A vehicle seat arrangement as claimed in claim 1, wherein the coupling device has a stop on one of the outer first seat, the central second seat and the outer third seat, the stop projecting at least on one side of said one of said outer first seat, said central second seat and said outer third seat in the transverse direction.

3. A vehicle seat arrangement as claimed in claim 1, wherein the coupling device has a lock on at least one seat and has a counter element on the adjacent seat in the transverse direction, the counter element cooperating with the lock.

4. A vehicle seat arrangement as claimed in claim 3, wherein:
    the coupling device has a stop on one of the outer first seat, the central second seat and the outer third seat, the stop projecting in the transverse direction at least on one side of said one of said outer first seat, said central second seat and said outer third seat; and the lock has a stop surface cooperating with a front face of the stop, the front face being front relative to the longitudinal direction.

5. A vehicle seat arrangement as claimed in claim 3, wherein the lock is provided on at least one of the two outer seats, and the counter element comprises at least one said locking bar, said locking bar for being extended in the transverse direction over the second seat, in order to cooperate with the lock.

6. A vehicle seat arrangement as claimed in claim 5, wherein the locking bar cooperates with a locking opening in a housing of the lock, in order to couple the second seat to the outer seat comprising the lock, the locking bar comprising a run-on slope, said run on slope, when the locking bar bears against the housing of the lock, introduces the locking bar.

7. A vehicle seat arrangement as claimed in claim 5, wherein the locking bar is articulated on a lever in a plane spanned by the longitudinal direction and the transverse direction, said lever being rotatably mounted on the second seat pretensioned on a projecting bearing pin of the second seat, fixed to the seat structure, and is pretensioned.

8. A vehicle seat arrangement as claimed in claim 1, wherein the release means is coupled to the unlocking of a lock, said lock being associated with at least one of said outer first seat and said outer third seat.

9. A vehicle seat arrangement as claimed in claim 1, wherein the release means has a control contour for cooperating with a control surface on a lock associated with at least one of the two outer seats.

10. A vehicle seat arrangement as claimed in claim 1, wherein the coupling device comprises two locking bars and release bars and two levers arranged as a mirror image to one another.

11. A vehicle seat arrangement as claimed in claim 1, further comprising seat rail pairs connected to the vehicle structure and actuating levers, wherein the seats are displaceable in the longitudinal direction by means of the seat rail pairs which may be unlocked by the actuating levers.

12. A vehicle seat arrangement as claimed in claim 11, wherein the outer seats, on a respective side facing the second seat, have an actuating element on one of the actuating levers which, when pushed onto an adjacent actuating lever of the second seat or an extension of said adjacent actuating lever of the second seat, unlocks the second seat.

13. A vehicle seat arrangement as claimed in claim 2, wherein said stop is arranged on one of two ends of the central seat.

14. A vehicle seat arrangement for a motor vehicle having a vehicle structure, the vehicle seat arrangement comprising:
a seat structure comprising an outer first seat, a central second seat and an outer third seat, each of said outer first seat, said central second seat and said outer third seat being mounted for movement such that said outer first seat, said central second seat and said outer third seat is movable in a longitudinal direction from a first position to a second position; and a coupling device, said central second seat being connected to one of said outer first seat and said outer third seat via said coupling device to form a first seat pair, said coupling device releasing said one of said outer first seat and said outer third seat when another of said outer first seat and said outer third seat moves from said first position to said second position, said coupling device connecting said second seat to said another of said outer first seat and said outer third seat to form a second seat pair when said coupling device releases said one of said outer first seat and said outer third seat, said coupling device comprising a first lock and a second lock, said first lock being located on said one of said outer first seat and said outer third seat, said second lock being located on said another of said outer first seat and said outer third seat, said first lock having a first lock recess, said second lock having a second lock recess, said coupling device comprising a first lever, a second lever, a first locking bar, a first release bar, a second locking bar and a second release bar, said first locking bar and said first release bar being connected to said first lever, said second locking bar and said second release bar being connected to said second lever, said first lock recess receiving one end of said first locking bar and said second release bar engaging said first lock when said central second seat is connected to said one of said outer first seat and said outer third seat, said second lock engaging said first release bar when said another of said outer first seat and said outer third seat moves from said first position to said second position such that said second lever pivots from a first lever position to a second lever position, said second recess receiving one end of said second locking bar when said second lever is in said second lever position, said first locking bar being located at a spaced location from said first lock recess when said lever is in said second lever position, said central second seat being connected to said another of said outer first seat and said outer third seat when said second lever is in said second lever position.

15. A vehicle seat arrangement as claimed in claim 14, wherein said coupling device has a stop on one of the outer first seat, the central second seat and the outer third seat, said stop projecting at least on one side of said one of said outer first seat, said central second seat and said outer third seat in a direction transverse of said longitudinal direction.

16. A vehicle seat arrangement as claimed in claim 14, wherein said coupling device has a stop on one of said outer first seat, said central second seat and said outer third seat, said stop extending in a direction perpendicular to said longitudinal direction, one end of said stop engaging said first lock when said central second seat is connected to said one of said outer first seat and said outer third seat, another end of said stop engaging said second lock when said central second seat is connected to said another of said outer first seat and said outer third seat.

* * * * *